US012160033B2

(12) United States Patent
Lee et al.

(10) Patent No.: US 12,160,033 B2
(45) Date of Patent: Dec. 3, 2024

(54) VEHICLE AND ANTENNA APPARATUS FOR VEHICLE

(71) Applicants: HYUNDAI MOTOR COMPANY, Seoul (KR); KIA CORPORATION, Seoul (KR)

(72) Inventors: Sang Heun Lee, Seoul (KR); Hyeon Je Son, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 47 days.

(21) Appl. No.: 17/992,321

(22) Filed: Nov. 22, 2022

(65) Prior Publication Data

US 2023/0178881 A1 Jun. 8, 2023

(30) Foreign Application Priority Data

Dec. 6, 2021 (KR) ........................ 10-2021-0172873

(51) Int. Cl.
*H01Q 5/40* (2015.01)
*H01Q 1/32* (2006.01)

(52) U.S. Cl.
CPC ............. *H01Q 1/3275* (2013.01); *H01Q 5/40* (2015.01)

(58) Field of Classification Search
None
See application file for complete search history.

(56) References Cited

U.S. PATENT DOCUMENTS 7,696,939 B2 * 4/2010 Sliskovic ............. H01Q 1/3275 343/711
2019/0176717 A1 * 6/2019 Gomes .................... B60R 11/04
2022/0285831 A1 * 9/2022 Huelsen ................. B62D 25/06
2023/0216218 A1 * 7/2023 Takenaka ................ B60R 11/02 343/702

FOREIGN PATENT DOCUMENTS

JP H11346114 A * 12/1999
JP 5624941 B2 * 11/2014
JP 2019068277 A * 4/2019 ............. G06T 5/006
JP 2019068281 A * 4/2019

* cited by examiner

*Primary Examiner* — Dameon E Levi
*Assistant Examiner* — Anh N Ho
(74) *Attorney, Agent, or Firm* — Morgan, Lewis & Bockius LLP

(57) ABSTRACT

A vehicle including a plurality of antennas, the vehicle including: a roof panel disposed on an upper side of the vehicle; a first roof rail and a second roof rail arranged side by side on the roof panel; and a first antenna module and a second antenna module disposed on the roof panel. The first antenna module is provided in a coupling area, in which the first roof rail is coupled to the roof panel, and the first antenna module is inserted into the first roof rail. The second antenna module is provided in a coupling area, in which the second roof rail is coupled to the roof panel, and the second antenna module is inserted into the second roof rail. The plurality of antennas are disposed in the first and second antenna modules in a distributed manner.

16 Claims, 8 Drawing Sheets

VEHICLE AND ANTENNA APPARATUS FOR VEHICLE

CROSS-REFERENCE TO RELATED APPLICATION

This application is based on and claims priority under 35 U.S.C. § 119 to Korean Patent Application No. 10-2021-0172873, filed on Dec. 6, 2021 in the Korean Intellectual Property Office, the disclosure of which is incorporated herein by reference.

BACKGROUND

1. Technical Field

The disclosure relates to a vehicle and an antenna for a vehicle, and more specifically, to a vehicle including an antenna apparatus built into a roof rail of the vehicle and a vehicle antenna.

2. Description of the Related Art

Generally, a vehicle refers to a transportation designed to travel on a road or railway using fossil fuel, electric power, and the like as a power source.

In recent years, vehicles are, beyond transporting materials and personnel, provided to include audio devices and video devices so that drivers may listen to music and view images while travelling, and also include a navigation device that displays a route to a destination.

For this reason, there is an increasing demand for a vehicle to communicate with an external device. For example, in the case of a navigation function for guiding a route to a destination, the vehicle may receive a global positioning system (GPS) signal from a GPS satellite to determine the location of the vehicle. The vehicle may receive a radio broadcast signal and/or a multimedia broadcast signal to reproduce broadcast sound and/or image. In addition, the vehicle may communicate with a mobile communication base station and/or other vehicles via a mobile communication service.

The vehicle may be provided with an antenna for communication with external devices. In particular, since the frequency of the GPS signal, the frequency of the broadcast signal, and the frequency of the mobile communication signal are different from each other, the vehicle is provided with a plurality of antennas having different shapes. In addition, the plurality of antennas may be integrally provided with each other.

On the other hand, the conventional antennas are assembled on the roof of the vehicle in the form of a shark pin or in the form of a pole, and thus are exposed to the outside. As a result, restrictions arise in the design and size of the antenna. For example, the antennas may include an AM/FM radio antenna, a global navigation satellite system (GNSS) antenna, a distributed matching antenna (DMA), and a mobile communication antenna, in which the four antennas are integrated with each other, thereby causing restriction in the design and size for safety reasons.

SUMMARY

Therefore, it is an object of the disclosure to provide an antenna apparatus built into a roof rail of a vehicle, and a vehicle including the antenna apparatus.

It is another object of the disclosure to provide an antenna apparatus including a plurality of antenna modules disposed at different positions on a roof rail of a vehicle, and a vehicle including the antenna apparatus.

The technical objectives of the disclosure are not limited to the above, and other objectives may become apparent to those of ordinary skill in the art based on the following descriptions.

According to an aspect of the disclosure, there is provided a vehicle including a plurality of antennas, the vehicle including: a roof panel disposed on an upper side of the vehicle, the roof panel including first and second coupling areas; a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein the first antenna module is disposed in the first coupling area, the first antenna module is inserted into the first roof rail, the second antenna module is disposed in the second coupling area, the second antenna module is inserted into the second roof rail, and the plurality of antennas are disposed in the first and second antenna modules in a distributed manner.

The first roof rail and the second roof rail may extend from a front side to a rear side of the roof panel, the roof panel may include a first front coupling area coupled to a front side of the first roof rail, a first rear coupling area coupled to a rear side of the first roof rail, a second front coupling area coupled to a front side of the second roof rail, and a second rear coupling area coupled to a rear side of the second roof rail. The first antenna module and the second antenna module may be disposed in different coupling areas among the first front coupling area, the first rear coupling area, the second front coupling area, and the second rear coupling area.

The first antenna module may be disposed in the first rear coupling area of the roof panel. The second antenna module may be disposed in the second rear coupling area of the roof panel.

The first antenna module may be disposed in the first front coupling area of the roof panel. The second antenna module may be disposed in the first rear coupling area of the roof panel.

The first antenna module may be disposed in the first front coupling area of the roof panel. The second antenna module may be disposed in the second rear coupling area of the roof panel.

The first roof rail may extend from a front side to a rear side of the roof panel, and include a first body portion, a first front support portion coupled to the front side of the roof panel, and a first rear support portion coupled to the rear side of the roof panel. The second roof rail may extend from the front side to the rear side of the roof panel, and may include a second body portion, a second front support portion coupled to the front side of the roof panel, and a second rear support portion coupled to the rear side of the roof panel. The first antenna module and the second antenna module may be inserted into different support portions among the first front support portion, the first rear support portion, the second front support portion, and the second rear support portion.

The first antenna module may be inserted into the first rear support portion of the first roof rail. The second antenna module may be inserted into the second rear support portion of the second roof rail.

The first antenna module may be inserted into the first front support portion of the first roof rail, and the second antenna module may be inserted into the first rear support portion of the first roof rail.

The first antenna module may be inserted into the first front support portion of the first roof rail, and the second antenna module may be inserted into the second rear support portion of the second roof rail.

The plurality of antennas may be disposed in the first antenna module and the second antenna module in a distributed manner based on operating frequencies of each of the plurality of antennas.

The plurality of antennas may include a first antenna having a first operating frequency, a second antenna having a second operating frequency greater than the first operating frequency, and a third antenna having a third operating frequency greater than the second operating frequency. The first antenna may be disposed in the first antenna module, and the second antenna and the third antenna may be disposed in the second antenna module.

The plurality of antennas may include an analog broadcasting antenna, a digital broadcasting antenna, a satellite navigation antenna, and first and second mobile communication antennas. The first antenna module may include the analog broadcasting antenna and the first mobile communication antenna. The second antenna module may include the digital broadcasting antenna, the satellite navigation antenna, and the second mobile communication antenna.

According to another aspect of the disclosure, there is provided a vehicle including a plurality of antennas, the vehicle including: a roof panel disposed on an upper side of the vehicle, the roof panel including a first front coupling area, a second front coupling area, a first rear coupling area, and a second rear coupling area; a first roof rail and a second roof rail arranged side by side on the roof panel while extending from a front side to a rear side of the roof panel, wherein a front side of the first roof rail is coupled to the roof panel in the first front coupling area, a front side of the second roof rail is coupled to the roof panel in the second front coupling area, a rear side of the first roof rail is coupled to the roof panel in the first rear coupling area, and a rear side of the second roof rail is coupled to the roof panel in the second rear coupling area; and first, second, third and fourth antenna modules disposed on the roof panel, wherein the first antenna module is disposed in the first front coupling area, and the first antenna module is inserted into the first roof rail; the second antenna module is disposed in the second front coupling area, and the second antenna module is inserted into the second roof rail; the third antenna module is disposed in the first rear coupling area, and the third antenna module is inserted into the first roof rail; and the fourth antenna module is disposed in the second rear coupling area, and the fourth antenna module is inserted into the second roof rail, wherein the plurality of antennas are disposed in the first antenna module, the second antenna module, the third antenna module, and the fourth antenna module in a distributed manner.

The first roof rail may extend from the front side to the rear side of the roof panel, and includes a first body portion, a first front support portion coupled to the front side of the roof panel, and a first rear support portion coupled to the rear side of the roof panel, the second roof rail may extend from the front side to the rear side of the roof panel, and include a second body portion, a second front support portion coupled to the front side of the roof panel, and a second rear support portion coupled to the rear side of the roof panel, and the first antenna module, the second antenna module, the third first antenna module, and the fourth first antenna module may be inserted into different support portions among the first front support portion, the first rear support portion, the second front support portion, and the second rear support portion.

The plurality of antennas may include an analog broadcasting antenna, a digital broadcasting antenna, a satellite navigation antenna, and first, second, third and fourth mobile communication antennas, the first antenna module may include the analog broadcasting antenna and the first mobile communication antenna, the second antenna module may include the digital broadcasting antenna and the second mobile communication antenna, the third antenna module may include the satellite navigation antenna and the third mobile communication antenna, and the fourth antenna module may include the fourth mobile communication antenna.

According to another aspect of the disclosure, there is provided an antenna apparatus for a vehicle including a plurality of antennas, the antenna apparatus including: a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail, the second antenna module is to be disposed in a second coupling area, in which a second roof rail of the vehicle is coupled to the roof panel, and inserted into the second roof rail, and the plurality of antennas are disposed in the first antenna module and the second antenna module in a distributed manner.

The first antenna module and the second antenna module may be disposed in different coupling areas among a first front coupling area in which the roof panel is coupled to a front side of the first roof rail, a first rear coupling area in which the roof panel is coupled to a rear side of the first roof rail, a second front coupling area in which the roof panel is coupled to a front side of the second roof rail, and a second rear coupling area in which the roof panel is coupled to a rear side of the second roof rail.

The first antenna module and the second antenna module may be inserted into different support portions among a first front support portion of the first roof rail coupled to the front side of the roof panel, a first rear support portion of the first roof rail coupled to the rear side of the roof panel, a second front support portion of the second roof rail coupled to the front side of the roof panel, and a second rear support portion of the second roof rail coupled to the rear side of the roof panel.

The plurality of antennas may be disposed in the first antenna module and the second antenna module in a distributed manner based on operating frequencies of each of the plurality of antennas.

The plurality of antennas may include an analog broadcasting antenna, a digital broadcasting antenna, a satellite navigation antenna, and first and second mobile communication antennas, the first antenna module may include the analog broadcasting antenna and the first mobile communication antenna, and the second antenna module may include the digital broadcasting antenna, the satellite navigation antenna, and the second mobile communication antenna.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
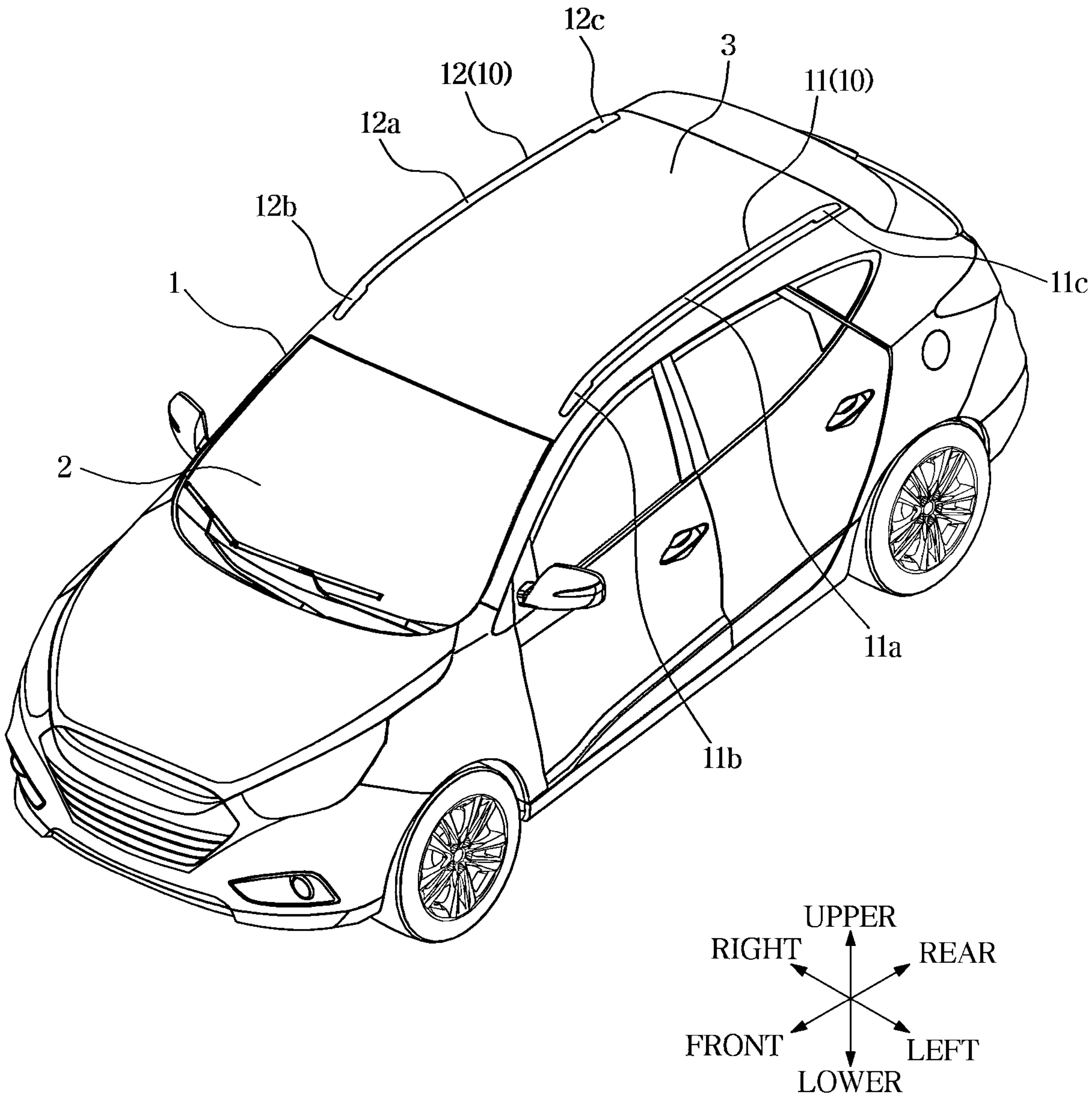
FIG. 1 is a view illustrating a vehicle according to an embodiment.

Like reference numerals denote like elements throughout the specification. In the specification, all elements of the embodiments are not described, and general contents in the art or repeated contents between the embodiments will not be described. Terms such as parts, modules, members, and blocks may be implemented using software or hardware, and a plurality of parts, modules, members, and blocks are implemented as a single element, or one part, module, member, or block may in addition include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network, or electrically connected to another part through wiring, soldering, or the like.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Through the specification, the expression of an ordinal number such as "first" and "second" is used to distinguish a plurality of members, and the used ordinal number does not indicate an arrangement order, a manufacturing order, importance, and the like of the members.

The singular expression includes a plural expression unless there are obvious exceptions in the context.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 2:
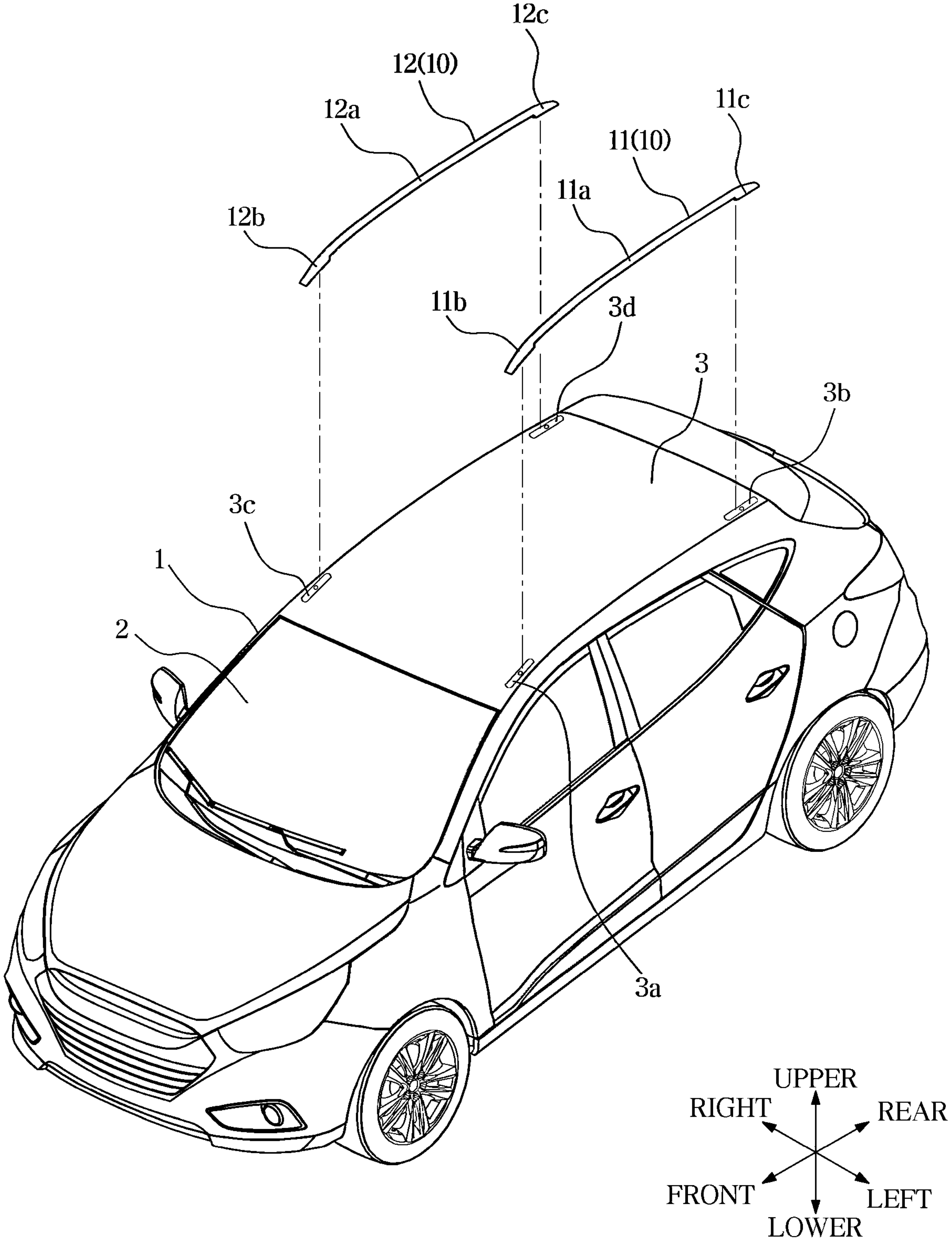
FIG. 2 is a view illustrating a state in which roof rails of a vehicle according to an embodiment are separated.

FIG. 1 is a view illustrating a vehicle according to an embodiment. FIG. 2 is a view illustrating a state in which roof rails of a vehicle according to an embodiment is separated.

FIG. 1 is a view illustrating a vehicle according to an embodiment. FIG. 2 is a view illustrating a state in which roof rails of a vehicle according to an embodiment is separated.

A vehicle 1 may include a body that forms the external appearance of the vehicle 1 and accommodates a driver and/or luggage, a chassis including components of the vehicle 1 other than the body, and electronic and installed part that protect the driver or provide convenience to the driver. The body may form an interior space in which the driver may stay, an engine room for accommodating an engine, and a trunk room for accommodating cargo. The chassis may include devices that generate power and allow the vehicle 1 to travel/brake/steer so that the vehicle 1 may travel according to the driver's control. Electronic and installed parts may provide control of the vehicle 1, safety and convenience of the driver and passengers.

As shown in FIG. 1, the vehicle 1 may be provided on a front side with a front window 2 that protects the driver from the outside of the vehicle 1 and secures a front view of a driver, and may be provided on an upper side with a roof panel 3 that forms a cabin of the vehicle 1 and corresponds to the ceiling of the cabin.

On the roof panel 3, a pair of roof rails 10 may be provided.

The roof rail 10 may include a first roof rail 11 fixed to one side of the roof panel 3 of the vehicle 1 and a second roof rail 12 fixed to the other side of the roof panel 3.

For example, as shown in FIG. 1, the first roof rail 11 and the second roof rail 12 may each have a bar shape, and may be disposed in the longitudinal direction based on the travelling direction of the vehicle 1. In addition, the first roof rail 11 may be disposed on a left portion of the roof panel 3, and the second roof rail 12 may be disposed on a right portion of the roof panel 3.

The roof rail 10 may be formed of a plastic polymer compound and may be provided on the upper side of the vehicle 1. For example, in order to reduce air resistance due to the roof rail 10, the roof rail 10 may extend from the front of the roof panel 3 to the rear of the roof panel 3 along the roof panel 3.

The roof rail 10 may fix a roof rack that loads cargo on the upper side of the vehicle 1. For example, the roof rack may be provided detachably on the roof rail 10, and cargo may be loaded on the roof rack.

The roof rail 10 may have both ends fixed to the roof panel 3 of the vehicle 1 and a central portion spaced apart from the roof panel 3 of the vehicle 1.

For example, the first roof rail 11 may include a first body portion **11*a* having a bar shape and fixing the roof rack, a first front support portion 11*b* coupled to the roof panel 3 at a front side of the first body portion 11*a*, and a first rear support portion 11*c* coupled to the roof panel 3 at a rear side of the first body portion 11*a*. The first body portion 11*a*, the first front support portion 11*b*, and the first rear support portion 11*c* may be integrally formed with each other, or the first body portion 11*a*, the first front support portion 11*b*, and the first rear support portion 11*c*** may be separately formed and assembled with each other.

In addition, the second roof rail 12 may include a second body portion **12*a* having a bar shape and fixing the roof rack, a second front support portion 12*b* coupled to the roof panel 3 at a front side of the second body portion 12*a*, and a second rear support portion 12*c* coupled to the roof panel 3 at a rear side of the second body portion 12*a*. The second body portion 12*a*, the second front support portion 12*b*, and the second rear support portion 12*c* may be integrally formed with each other, or the second body portion 12*a*, the second front support portion 12*b*, and the second rear support portion 12*c*** may be separately formed and assembled with each other.

The roof rail 10 may have a hollow formed therein for weight reduction. In particular, hollows may be formed in support portions 11*b*, 11*c*, 12*b*, and 12*c* supporting the roof rail 10. A plurality of antennas may be inserted into each of the inner hollows of the support portions 11*b*, 11*c*, 12*b*, and 12*c*.

The roof panel 3 may be provided with coupling portions 3*a*, 3*b*, 3*c*, and 3*d* coupled to the support portions 11*b*, 11*c*, 12*b*, and 12*c* of the roof rails 10.

For example, as shown in FIG. 2, the coupling portions 3*a*, 3*b*, 3*c*, and 3*d* may be respectively disposed at four corners of the roof panel 3. A first front coupling portion 3*a* may be coupled to a first front support portion 11*b* of the first roof rail 11 at the front left side of the roof panel 3, a first rear coupling portion 3*b* may be coupled to a first rear support portion 11*c* of the first roof rail 11 at the rear left side of the roof panel 3, a second front coupling portion 3*c* may be coupled to a second front support portion 12*b* of the second roof rail 12 at the front right side of the roof panel 3, and a second rear coupling portion 3*d* may be coupled to a second rear support portion 12*c* of the second roof rail 12 at the rear right side of the roof panel 3.

In at least two of the coupling portions among the coupling portions 3*a*, 3*b*, 3*c*, and 3*d*, antenna modules may be provided, respectively.

The antenna apparatus of the vehicle 1 may include a plurality of antenna modules, and the antenna modules may be disposed on at least two coupling portions among the coupling portions 3*a*, 3*b*, 3*c*, and 3*d*. Specifically, the antenna modules may be disposed on at least two coupling portions of the coupling portions 3*a*, 3*b*, 3*c*, and 3*d*, and may be inserted into the hollows of the support portions 11*b*, 11*c*, 12*b*, and 12*c* of the roof rails 10 when the roof rails 10 are coupled to the roof panel 3.

Each of the antenna modules may include a plurality of antennas capable of transmitting and receiving wireless signals of different frequencies.

The antenna modules may be disposed in different coupling portions 3*a*, 3*b*, 3*c*, and 3*d*, and the antenna modules may be spatially spaced apart from each other. Thereby, the antenna modules may provide spatial diversity.

Figure 3:
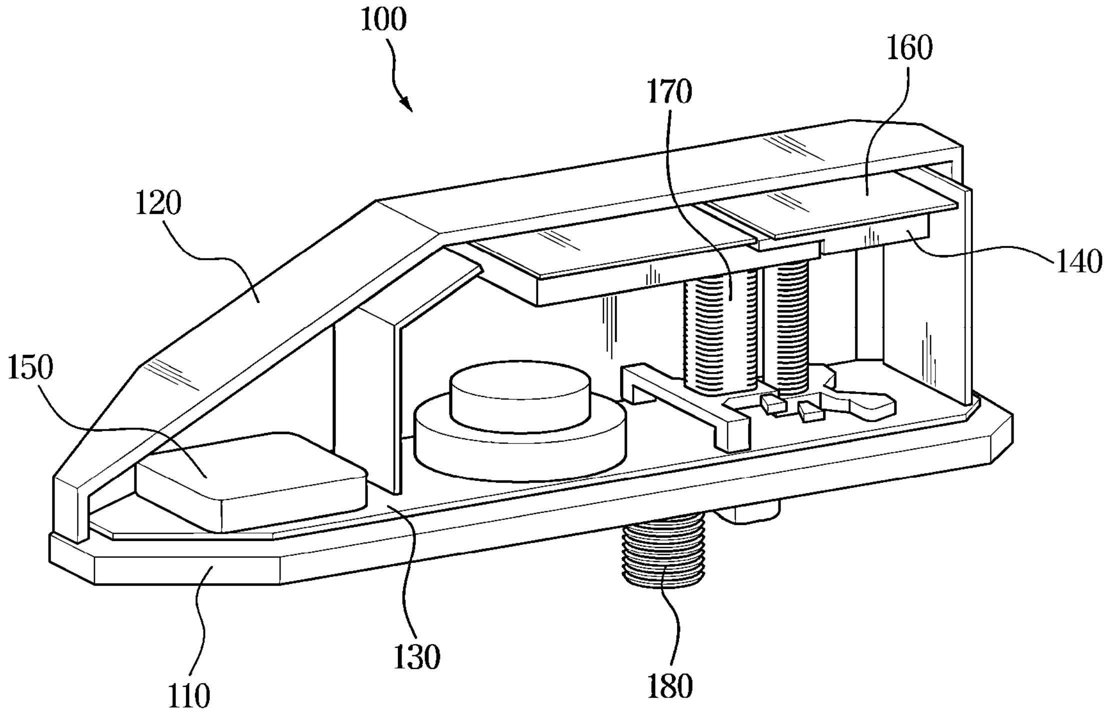
FIG. 3 is a view illustrating an example of an antenna module installed on a roof panel of a vehicle according to an embodiment.
Figure 4:
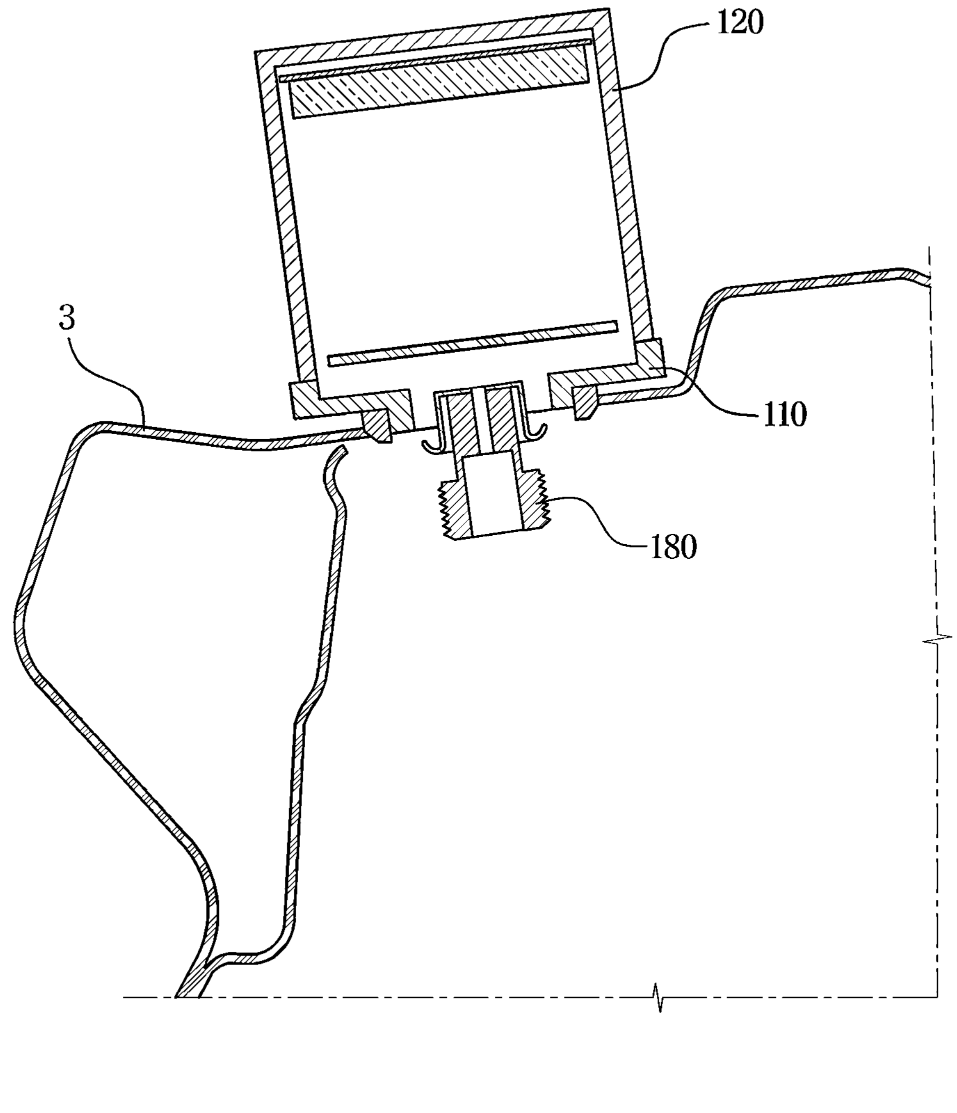
FIG. 4 is a view illustrating an example in which an antenna module is coupled to a roof panel of a vehicle according to an embodiment.

FIG. 3 is a view illustrating an example of an antenna module installed on a roof panel of a vehicle according to an embodiment. FIG. 4 is a view illustrating an example in which an antenna module is coupled to a roof panel of a vehicle according to an embodiment.

Referring to FIGS. 3 and 4, an antenna module 100 may include an antenna base 110, an antenna cover 120, an antenna circuit board 130, an antenna carrier 140, a first antenna 150, a second antenna 160, a third antenna 170, and an antenna connector 180.

The antenna base 110 may be coupled to one of the coupling portions 3*a*, 3*b*, 3*c*, and 3*d* of the roof panel 3, and allow the antenna module 100 to be fixed to the roof panel 3 of the vehicle 1. The antenna base 110 may support/fix the antenna circuit board 130.

The antenna base 110 may include a fastening member for coupling to the antenna cover 120 and a fastening member for coupling to the roof panel 3 of the vehicle 1.

The antenna cover 120 may protect structures and circuits included in the antenna module 100 from external shocks and environmental factors.

The antenna cover 120 may be coupled to the antenna base 110. For example, the antenna cover 120 may be coupled to the antenna base 110 through the fastening member.

The antenna cover 120 may be formed of a non-conductive material so as not to interfere with radio waves transmitted and received by the plurality of antennas 150, 160, and 170 included in the antenna module 100. For example, the antenna cover 120 may be formed of polycarbonate (PC), acrylonitrile butadiene styrene (ABS) or the like having low interference with radio waves.

The antenna circuit board 130 may be disposed parallel to the roof panel 3 of the vehicle 1 on the antenna base 110. The antenna circuit board 130 mounts the plurality of antennas 150, 160, and 170 included in the antenna module 100 and circuit elements thereon. For example, the antenna circuit board 130 may mount electrical elements for processing or amplifying signals received from the plurality of antennas 150, 160, and 170. In addition, the antenna circuit board 130 may have a circuit pattern for connecting the plurality of antennas 150, 160, and 170 to a plurality of electronic and installed parts (e.g., a navigation system, a head unit, etc.) included in the vehicle 1. The antenna circuit board 130 may be formed of a rigid printed circuit board (rigid PCB).

The antenna carrier 140 may be fixed to the antenna circuit board 130. The antenna carrier 140 may support the second antenna 160 and/or the third antenna 170.

The antenna carrier 140 may be formed of a non-conductive material so as not to interfere with radio waves transmitted and received by the second antenna 160 and/or the third antenna 170. For example, the antenna carrier 140 may be formed of polycarbonate, acrylonitrile butadiene styrene, or the like having low interference with radio waves.

The first antenna 150 may be fixed to the antenna circuit board 130 and may transmit/receive a wireless signal having a frequency corresponding to a first frequency range. The first antenna 150 may include, for example, a patch antenna, and may be directly electrically connected to the antenna circuit board 130.

The second antenna 160 may be fixed to the antenna carrier 140 and may transmit/receive a wireless signal having a frequency corresponding to a second frequency range. The second antenna 160 may include, for example, a patch antenna, and may be electrically connected to the antenna circuit board 130 through the antenna carrier 140.

The third antenna 170 may be fixed to the antenna carrier 140 and may transmit a wireless signal having a frequency corresponding to a third frequency range. The third antenna 170 may include, for example, a helical antenna, and may be electrically connected to the antenna circuit board 130.

The antenna connector 180 may protrude downward from the antenna base 110. For example, the antenna circuit board 130 may be disposed on a first surface of the antenna base 110, and the antenna connector 180 may be disposed on a second surface of the antenna base 110.

The antenna connector 180 may be electrically connected to the antenna circuit board 130. In addition, the antenna connector 180 may be electrically connected to the first antenna 150, the second antenna 160, and the third antenna 170 through the antenna circuit board 130.

The antenna connector 180 may transmit electrical signals transmitted from a plurality of electronic and installed parts (e.g., a navigation system, a head unit, etc.) included in the vehicle 1 to the antenna circuit board 130 such that the electrical signals are emitted through the first antenna 150, the second antenna 160, and the third antenna 170. In addition, the antenna connector 180 may transmit electrical signals received through the first antenna 150, the second antenna 160, and the third antenna 170 to a plurality of electronic and installed parts included in the vehicle 1.

The antenna connector 180 may be inserted into the vehicle 1 through a hole formed in the roof panel 3 of the vehicle 1 as shown in FIG. 4, and may be coupled to a connector of the vehicle 1.

As such, the antenna module 100 may include the plurality of antennas 150, 160, and 170 including the first antenna 150, the second antenna 160, and/or the third antenna 170.

Each of the plurality of antennas 150, 160, and 170 may be an antenna capable of transmitting and receiving wireless signals in various frequency ranges for various purposes.

For example, the plurality of antennas may include an antenna for receiving analog broadcasting, an antenna for receiving digital broadcasting, an antenna for satellite navigation, an antenna for mobile communication, an antenna for vehicle communication, and the like.

Analog broadcasting may include AM broadcasting and FM broadcasting. AM broadcasting may use a wireless signal in a frequency range of approximately 500 kHz to 1,800 kHz, and FM broadcasting may use a wireless signal in a frequency range of approximately 70 MHz to 110 MHz.

The antenna apparatus of the vehicle 1 may include an analog broadcasting antenna to receive analog broadcast, and may receive not only an FM broadcast signal but also an AM broadcast signal through the analog broadcasting antenna.

Digital broadcasting may include Digital Multimedia Broadcasting (DMB) broadcasting (Korea and Europe) and SXM broadcasting (USA). DMB broadcasting may use a wireless signal in a frequency range of approximately 174 MHz to 240 MHz, and SXM broadcasting may use a wireless signal in a frequency range of approximately 2300 MHz to 2350 MHz.

The antenna apparatus may include a digital broadcasting antenna to receive digital broadcasting. The digital broadcasting antenna may receive DMB broadcasting or SXM broadcasting according to regions.

The antenna apparatus may receive a global navigation satellite system (GNSS) signal for satellite navigation. The GNSS signal may be a wireless signal in a frequency range of approximately 1,164 MHz to 1,300 MHz, or a wireless signal in a frequency range of approximately 1,559 MHz to 1,610 MHz.

The antenna apparatus may include a GNSS antenna to receive a GNSS signal.

Mobile communication may use a wireless signal in a frequency range of approximately 600 MHz to 5,000 MHz. Mobile communication may require one, or two or more antennas depending on the mobile communication generation. For example, 3G mobile communication requires one antenna, but 4G mobile communication requires two antennas. In addition, 5G mobile communication requires four antennas to apply Multiple Input Multiple Output (MIMO).

The antenna apparatus may include four mobile communication antennas to support 3G and 4G mobile communication as well as 5G mobile communication. For example, the antenna apparatus may include a first mobile communication antenna, a second mobile communication antenna, a third mobile communication antenna, and a fourth mobile communication antenna.

Vehicle communication may use a wireless signal in a frequency range of approximately 5.8 GHz to 6.0 GHz. The vehicle communication (vehicle to everything: V2X) may include vehicle to vehicle (V2V), vehicle to infrastructure (V21), vehicle to network (vehicle to Nomadic device, V2N), vehicle to pedestrian (V2P), and the like. In addition, vehicle communication may require two V2X communication antennas for spatial diversity.

The antenna apparatus may include two V2X communication antennas to support V2X communication. For example, the antenna apparatus may include a first V2X communication antenna and a second V2X communication antenna.

As such, the antenna apparatus may include a plurality of antennas. For example, the antenna apparatus may include an analog broadcasting antenna, a digital broadcasting antenna, a GNSS antenna, two or four mobile communication antennas, and two V2X communication antennas. In other words, the vehicle 1 may include seven or nine antennas.

As described above, the antenna apparatus may include at least two antenna modules. Here, the plurality of antennas may be disposed in at least two antenna modules in a distributed manner. For example, seven or nine antennas may be disposed in two antenna modules in a distributed manner, or seven or nine antennas may be disposed in three antenna modules in a distributed manner, or seven or nine antennas may be disposed in four antenna modules in a distributed manner.

Hereinafter, an example in which a plurality of antennas are disposed in at least two antenna modules in a distributed manner is described.

Figure 5:
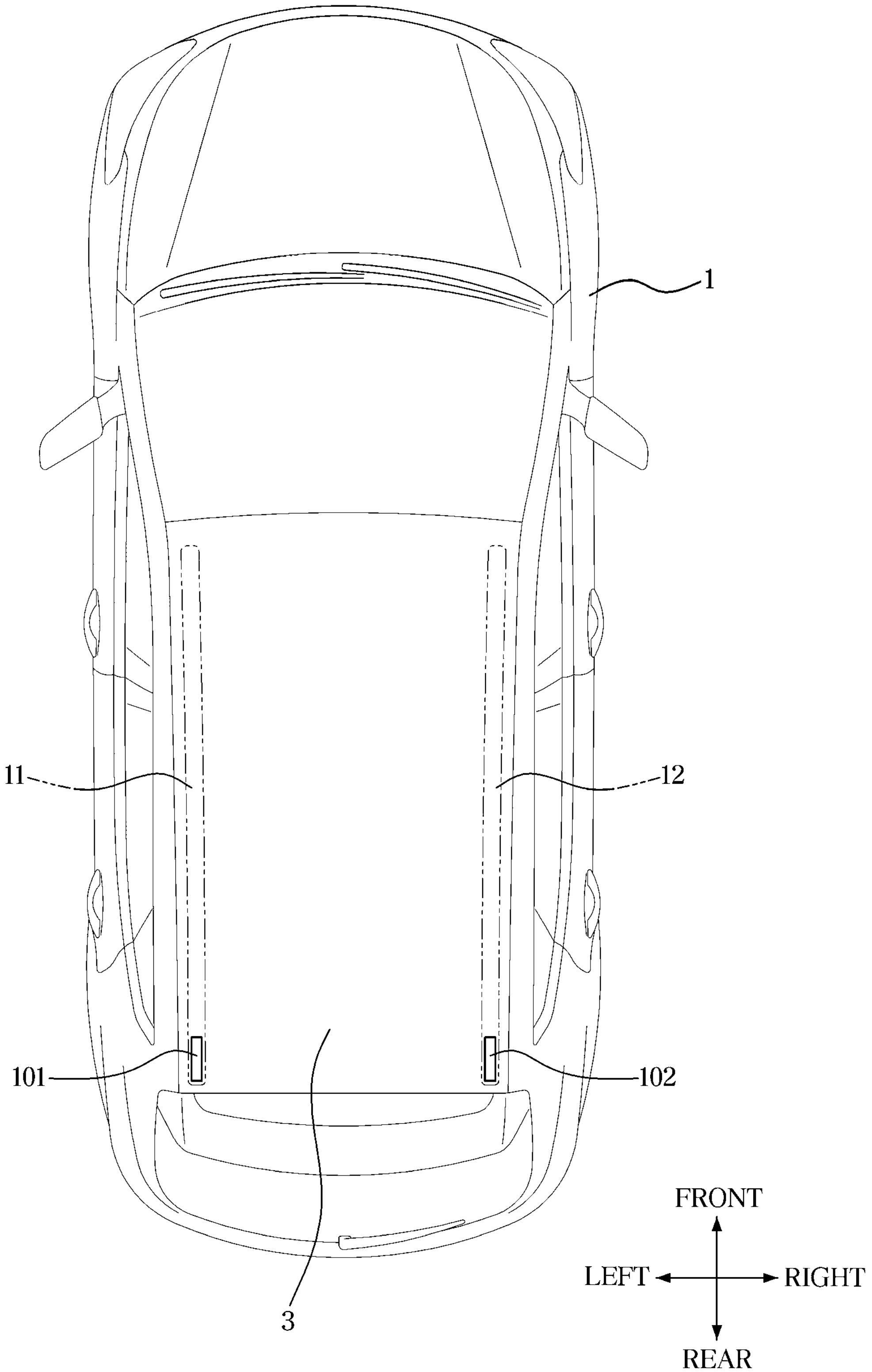
FIGS. 5, 6, and 7 are views illustrating examples of the arrangement of antenna modules included in a vehicle according to an embodiment.
Figure 6:
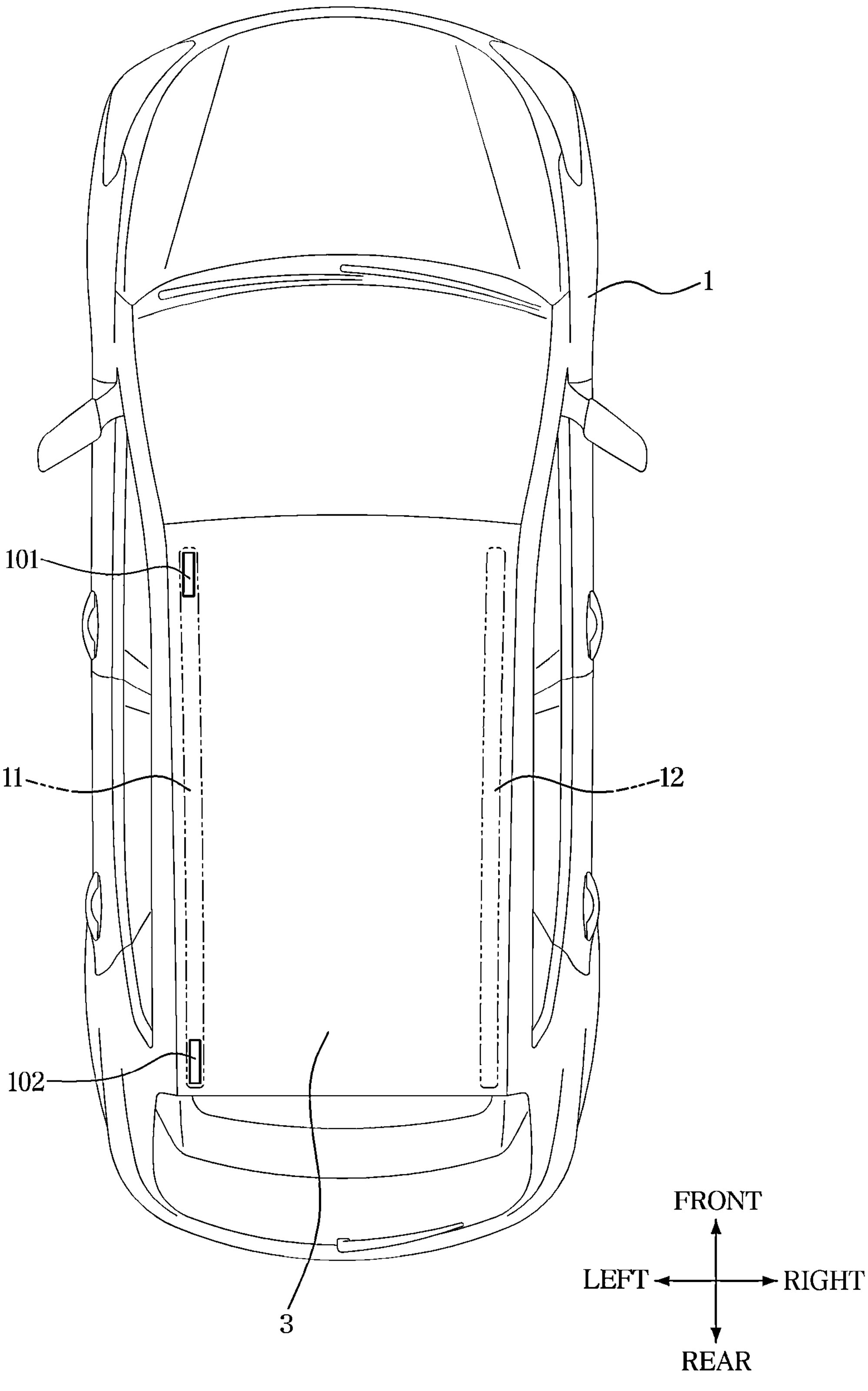
Figure 7:
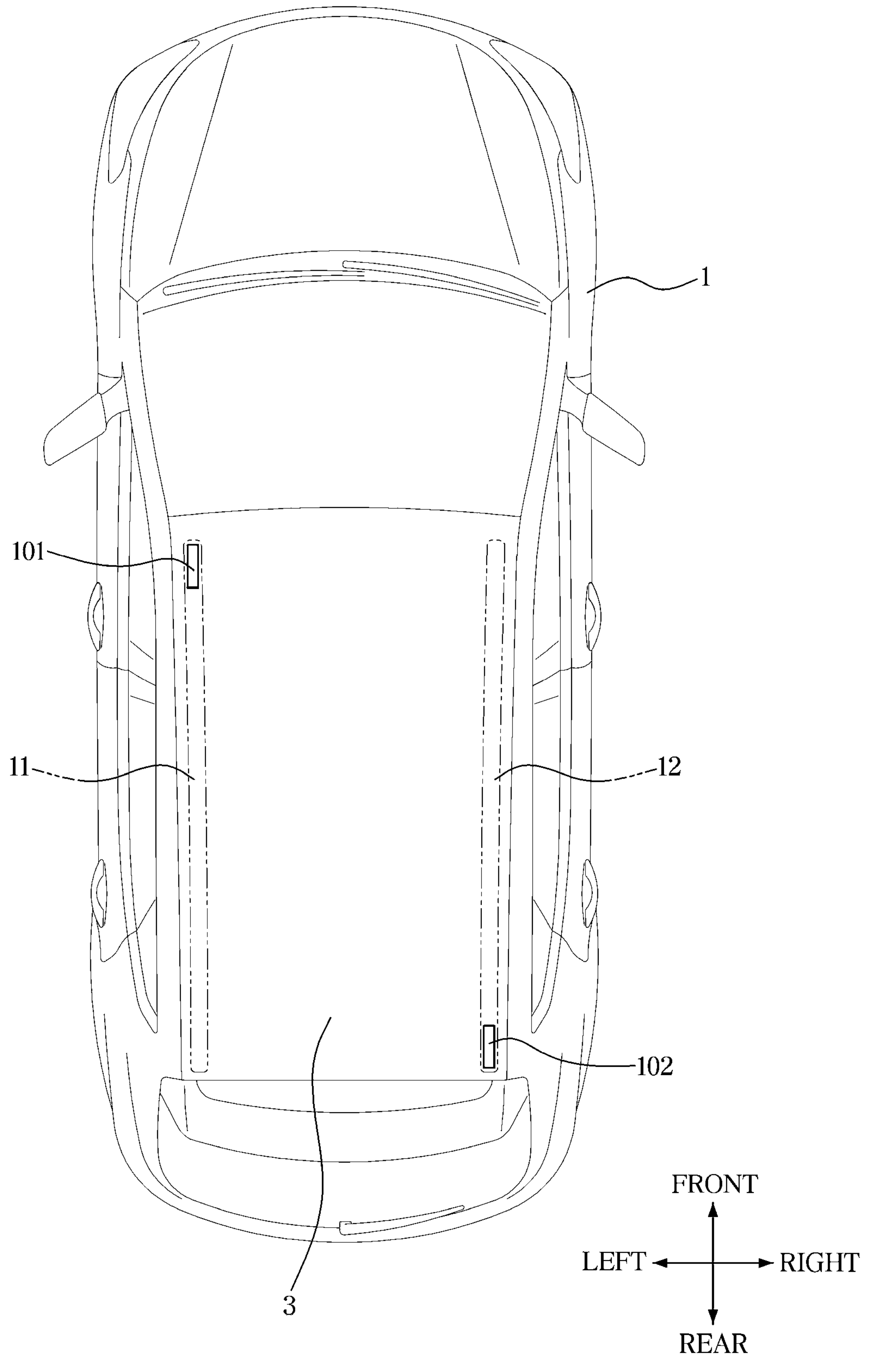

FIGS. 5, 6, and 7 are views illustrating examples of the arrangement of antenna modules included in a vehicle according to an embodiment.

Referring to FIGS. 5, 6 and 7, the antenna apparatus may include a first antenna module 101 and a second antenna module 102.

For example, as shown in FIG. 5, the first antenna module 101 may be provided in the first rear support portion 11*c* of the first roof rail 11, and the second antenna module 102 may be provided in the second rear support portion 12*c* of the second roof rail 12. In FIG. 5, the antenna modules 101 and 102 are illustrated as being provided in the rear support portions 11*c* and 12*c*, respectively, but the disclosure is not limited thereto. For example, the antenna modules 101 and 102 may be provided in the front support portions 11*b* and 12*b*, respectively.

As another example, as shown in FIG. 6, the first antenna module 101 may be provided in the first front support portion 11*b* of the first roof rail 11, and the second antenna module 102 may be provided in the first rear support portion 11*c* of the first roof rail 11. In FIG. 6, the antenna modules 101 and 102 are illustrated as being provided in the support portions 11*b* and 11*c* of the first roof rail 11, respectively, but the disclosure is not limited thereto. For example, the antenna modules 101 and 102 may be provided in the support portions 12*b* and 12*c* of the second roof rail 12, respectively.

As another example, as shown in FIG. 7, the first antenna module 101 may be provided in the first front support portion 11*b* of the first roof rail 11, and the second antenna module 102 may be provided in the second rear support portion 12*c* of the second roof rail 12. However, the disclosure is not limited thereto, and the first antenna module 101 may be provided in the first rear support portion 11*c* of the first roof rail 11, and the second antenna module 102 may be provided in the second front support portion 12*b* of the second roof rail 12.

A plurality of antennas may be disposed in the first antenna module 101 and the second antenna module 102 in a distributed manner.

For example, in the first antenna module 101 and the second antenna module 102, an analog broadcasting antenna, a digital broadcasting antenna, a GNSS antenna, and first and second mobile communication antennas may be disposed in a distributed manner. In other words, the antenna apparatus may support 4G mobile communication.

The size of the antenna may be inversely proportional to the frequency of the wireless signal and proportional to the wavelength of the wireless signal. Accordingly, the analog broadcasting antenna may be larger than the digital broadcasting antenna, the digital broadcasting antenna may be larger than the first and second mobile communication antennas, and the first and second mobile communication antennas may be larger than the GNSS antenna. In order to reduce the size of the antenna module, antennas of having a large size may be arranged separately from each other.

In the first antenna module 101, an analog broadcasting antenna and a first mobile communication antenna may be disposed, and in the second antenna module 102, a digital broadcasting antenna, a GNSS antenna, and a second mobile communication antenna may be disposed. As such, the analog broadcasting antenna and the digital broadcasting antenna having a large size may be separately disposed.

As another example, in the first antenna module 101 and the second antenna module 102, first and second analog broadcasting antennas, a digital broadcasting antenna, a GNSS antennas, and first and second mobile communication antennas may be disposed in a distributed manner.

In the first antenna module 101, a first analog broadcasting antenna, a digital broadcasting antenna, and a first mobile communication antenna may be disposed, and in the second antenna module 102, a second analog broadcasting antenna, a GNSS antenna, and a second mobile communication antenna may be disposed. As such, the first analog broadcasting antenna and the second analog broadcasting antenna having a large size may be separately disposed.

Figure 8:
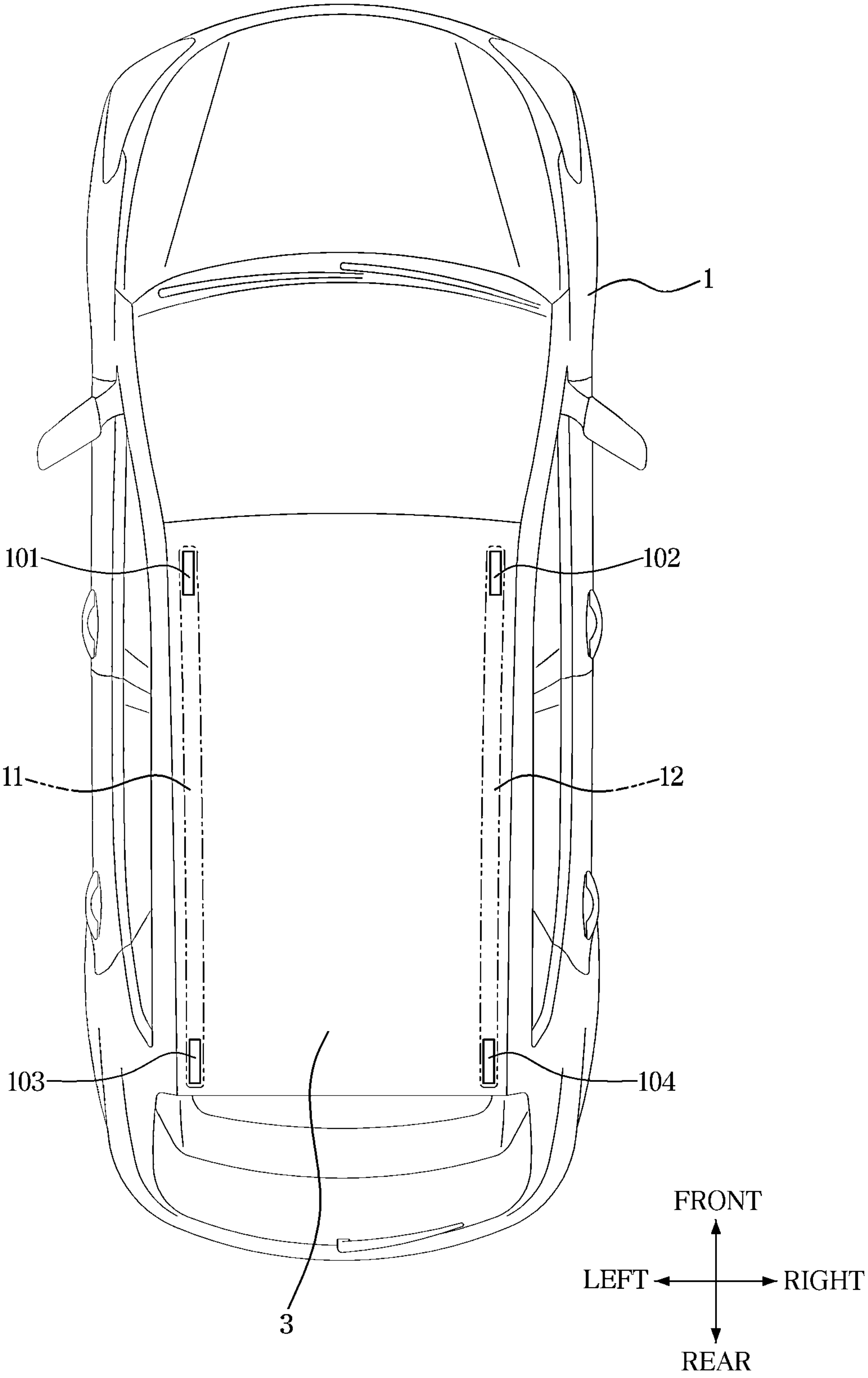
FIG. 8 is a view illustrating the arrangement of antenna modules included in a vehicle according to an embodiment.

FIG. 8 is a view illustrating an example of the arrangement of antenna modules included in a vehicle according to an embodiment.

As shown in FIG. 8, the antenna apparatus may include a first antenna module 101, a second antenna module 102, a third antenna module 103, and a fourth antenna module 104.

For example, as shown in FIG. 8, the first antenna module 101 may be provided in the first front support portion 11*b* of the first roof rail 11, and the second antenna module 102 may be provided in the second front support portion 12*b* of the second roof rail 12. In addition, the third antenna module 103 may be provided in the first rear support portion 11*c* of the first roof rail 11, and the fourth antenna module 104 may be provided in the second rear support portion 12*c* of the second roof rail 12.

In the first, second, third, and fourth antenna modules 101, 102, 103, and 104, a plurality of antennas may be disposed in a distributed manner.

For example, in the first, second, third, and fourth antenna modules 101, 102, 103 and 104, analog broadcasting antennas, digital broadcasting antennas, GNSS antennas, and first and second mobile communication antennas may be disposed in a distributed manner. In particular, in order to reduce the size of the antenna module, the analog broadcasting antenna and the digital broadcasting antenna having a large size may be separately disposed from each other. In other words, the antenna apparatus may support 4G mobile communication.

In the first antenna module 101, an analog broadcasting antenna may be disposed, and in the second antenna module 102, a digital broadcasting antenna may be disposed. In addition, a GNSS antenna and a first mobile communication antenna may be disposed in the third antenna module 103, and a second mobile communication antenna may be disposed in the fourth antenna module 104.

As another example, in the first antenna module 101 and the second antenna module 102, first and second analog broadcasting antennas, digital broadcasting antennas, GNSS antennas, and first and second mobile communication antennas may be disposed in a distributed manner.

In the first antenna module 101, a first analog broadcasting antenna may be disposed, and in the second antenna module 102, a second analog broadcasting antenna may be disposed. In addition, a digital broadcasting antenna and a first mobile communication antenna may be disposed in the third antenna module 103, and a GNSS broadcasting antenna and a second mobile communication antenna may be arranged in the fourth antenna module 104.

As another example, in the first antenna module 101 and the second antenna module 102, an analog broadcasting antenna, a digital broadcasting antenna, a GNSS antenna, first, second, third and fourth mobile communication antennas, and first and second V2X communication antennas may be disposed in a distributed manner. In other words, the antenna apparatus may support 5G mobile communication and V2X communication.

In the first antenna module 101, an analog broadcasting antenna and a first mobile communication antenna may be disposed, and in the second antenna module 102, a digital broadcasting antenna and a second mobile communication antenna may be disposed. In addition, a GNSS antenna, a third mobile communication antenna, and a first V2X communication antenna may be disposed in the third antenna module 103, and a fourth mobile communication antenna and a second V2X communication antenna may be disposed in the fourth antenna module 104. As described above, the analog broadcasting antenna and the digital broadcasting antenna having a large size may be separately arranged from each other, and the four mobile communication antennas may be spaced apart from each other at different positions in the vehicle 1.

As another example, in the first antenna module 101 and the second antenna module 102, first and second analog broadcasting antennas, digital broadcasting antennas, GNSS antennas, and first, second, third and fourth mobile communication antennas, and first and second V2X communication antennas may be disposed in a distributed manner.

In the first antenna module 101, a first analog broadcasting antenna, a first mobile communication antenna, and a first V2X communication antenna may be disposed, and in the second antenna module 102, a second analog broadcasting antenna and a second mobile communication antenna may be disposed. In addition, a GNSS antenna and a third mobile communication antenna may be disposed in the third antenna module 103, and a digital broadcasting antenna, a fourth mobile communication antenna, and a second V2X communication antenna may be disposed in the fourth antenna module 104. As described above, the first analog broadcasting antenna, the second analog broadcasting antenna, and the digital broadcasting antenna having a large size may be separately disposed, and the four mobile communication antennas may be disposed at different positions in the vehicle 1. In addition, the first V2X communication antenna and the second V2X communication antenna may be disposed to be maximally spaced apart from each other.

As described above, the antenna apparatus may include a plurality of antenna modules provided in the roof rail 10 of the vehicle 1. In addition, the plurality of antennas using different frequency wavelengths may be disposed in the plurality of antenna modules in a distributed manner.

Accordingly, interference between wireless signals may be reduced, suppressed or prevented, and spatial diversity may be provided. In addition, by disposing the antennas in a distributed manner, the size of each of the antenna modules may be reduced.

As is apparent from the above, according to one aspect of the disclosure, an antenna apparatus built into a roof rail of a vehicle, and a vehicle including the antenna apparatus can be provided.

According to one aspect of the disclosure, an antenna apparatus including a plurality of antenna modules disposed at different positions on a roof rail of a vehicle, and a vehicle including the antenna apparatus can be provided.

Although embodiments of the present disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. A vehicle including a plurality of antennas, the vehicle comprising:

a roof panel disposed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and the plurality of antennas are disposed in the first and second antenna modules in a distributed manner, wherein the plurality of antennas are disposed in the first antenna module and the second antenna module in a distributed manner based on operating frequencies of each of the plurality of antennas, wherein the plurality of antennas comprise a first antenna having a first operating frequency, a second antenna having a second operating frequency greater than the first operating frequency, and a third antenna having a third operating frequency greater than the second operating frequency, and wherein the first antenna is disposed in the first antenna module, and the second antenna and the third antenna are disposed in the second antenna module.

2. The vehicle of claim 1, wherein the first roof rail and the second roof rail extend from a front side to a rear side of the roof panel, the first coupling area comprises a first front coupling area coupled to a front side of the first roof rail, a first rear coupling area coupled to a rear side of the first roof rail, and the second coupling area comprises a second front coupling area coupled to a front side of the second roof rail, and a second rear coupling area coupled to a rear side of the second roof rail, and the first antenna module and the second antenna module are disposed in different coupling areas among the first front coupling area, the first rear coupling area, the second front coupling area, and the second rear coupling area.

3. The vehicle of claim 2, wherein the first antenna module is disposed in the first rear coupling area of the roof panel, and the second antenna module is disposed in the second rear coupling area of the roof panel.

4. The vehicle of claim 2, wherein the first antenna module is disposed in the first front coupling area of the roof panel, and the second antenna module is disposed in the first rear coupling area of the roof panel.

5. The vehicle of claim 2, wherein the first antenna module is disposed in the first front coupling area of the roof panel, and the second antenna module is disposed in the second rear coupling area of the roof panel.

6. The vehicle of claim 1, wherein the first roof rail extends from a front side to a rear side of the roof panel, and comprises a first body portion, a first front support portion coupled to the front side of the roof panel, and a first rear support portion coupled to the rear side of the roof panel, the second roof rail extends from the front side to the rear side of the roof panel, and comprises a second body portion, a second front support portion coupled to the front side of the roof panel, and a second rear support portion coupled to the rear side of the roof panel, and the first antenna module and the second antenna module are inserted into different support portions among the first front support portion, the first rear support portion, the second front support portion, and the second rear support portion.

7. The vehicle of claim 6, wherein the first antenna module is inserted into the first rear support portion of the first roof rail, and the second antenna module is inserted into the second rear support portion of the second roof rail.

8. The vehicle of claim 6, wherein the first antenna module is inserted into the first front support portion of the first roof rail, and the second antenna module is inserted into the first rear support portion of the first roof rail.

9. The vehicle of claim 6, wherein the first antenna module is inserted into the first front support portion of the first roof rail, and the second antenna module is inserted into the second rear support portion of the second roof rail.

10. The vehicle of claim 1, wherein the plurality of antennas comprise an analog broadcasting antenna, a digital broadcasting antenna, a satellite navigation antenna, and first and second mobile communication antennas, the first antenna module comprises the analog broadcasting antenna and the first mobile communication antenna, and the second antenna module comprises the digital broadcasting antenna, the satellite navigation antenna, and the second mobile communication antenna.

11. A vehicle including a plurality of antennas, the vehicle comprising:

a roof panel disposed on an upper side of the vehicle, the roof panel including a first front coupling area, a second front coupling area, a first rear coupling area, and a second rear coupling area;

a first roof rail and a second roof rail arranged side by side on the roof panel while extending from a front side to a rear side of the roof panel, wherein a front side of the first roof rail is coupled to the roof panel in the first front coupling area, a front side of the second roof rail is coupled to the roof panel in the second front coupling area, a rear side of the first roof rail is coupled to the roof panel in the first rear coupling area, and a rear side of the second roof rail is coupled to the roof panel in the second rear coupling area; and first, second, third and fourth antenna modules disposed on the roof panel, wherein:

the first antenna module is disposed in the first front coupling area, and the first antenna module is inserted into the first roof rail;

the second antenna module is disposed in the second front coupling area, and the second antenna module is inserted into the second roof rail;

the third antenna module is disposed in the first rear coupling area, and the third antenna module is inserted into the first roof rail; and the fourth antenna module is disposed in the second rear coupling area, and the fourth antenna module is inserted into the second roof rail, wherein the plurality of antennas are disposed in the first antenna module, the second antenna module, the third antenna module, and the fourth antenna module in a distributed manner, wherein the plurality of antennas comprises an analog broadcasting antenna, a digital broadcasting antenna, a satellite navigation antenna, and first, second, third and fourth mobile communication antennas, wherein the first antenna module comprises the analog broadcasting antenna and the first mobile communication antenna, wherein the second antenna module comprises the digital broadcasting antenna and the second mobile communication antenna, wherein the third antenna module comprises the satellite navigation antenna and the third mobile communication antenna, and wherein the fourth antenna module comprises the fourth mobile communication antenna.

12. The vehicle of claim 11, wherein the first roof rail extends from the front side to the rear side of the roof panel, and comprises a first body portion, a first front support portion coupled to the front side of the roof panel, and a first rear support portion coupled to the rear side of the roof panel, the second roof rail extends from the front side to the rear side of the roof panel, and comprises a second body portion, a second front support portion coupled to the front side of the roof panel, and a second rear support portion coupled to the rear side of the roof panel, and the first antenna module, the second antenna module, the third antenna module, and the fourth antenna module are inserted into different support portions among the first front support portion, the first rear support portion, the second front support portion, and the second rear support portion.

13. An antenna apparatus for a vehicle including a plurality of antennas, the antenna apparatus comprising:

a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail, the second antenna module is to be disposed in a second coupling area, in which a second roof rail of the vehicle is coupled to the roof panel, and inserted into the second roof rail, and the plurality of antennas are disposed in the first antenna module and the second antenna module in a distributed manner, wherein the plurality of antennas comprise an analog broadcasting antenna, a digital broadcasting antenna, a satellite navigation antenna, and first and second mobile communication antennas, the first antenna module comprises the analog broadcasting antenna and the first mobile communication antenna, and the second antenna module comprises the digital broadcasting antenna, the satellite navigation antenna, and the second mobile communication antenna.

14. The antenna apparatus of claim 13, wherein the first coupling area comprises a first front coupling area coupled to a front side of the first roof rail, a first rear coupling area coupled to a rear side of the first roof rail, the second coupling area comprises a second front coupling area coupled to a front side of the second roof rail, and a second rear coupling area coupled to a rear side of the second roof rail, and wherein the first antenna module and the second antenna module are disposed in different coupling areas among the first front coupling area, the first rear coupling area, the second front coupling area, and the second rear coupling area.

15. The antenna apparatus of claim 13, wherein the first antenna module and the second antenna module are inserted into different support portions among a first front support portion of the first roof rail coupled to the front side of the roof panel, a first rear support portion of the first roof rail coupled to the rear side of the roof panel, a second front support portion of the second roof rail coupled to the front side of the roof panel, and a second rear support portion of the second roof rail coupled to the rear side of the roof panel.

16. The antenna apparatus of claim 13, wherein the plurality of antennas are disposed in the first antenna module and the second antenna module in a distributed manner based on operating frequencies of each of the plurality of antennas.

* * * * *